(12) United States Patent
Michisaka et al.

(10) Patent No.: US 8,474,895 B2
(45) Date of Patent: Jul. 2, 2013

(54) INNER RACK STRUCTURE FOR SADDLE-RIDE TYPE VEHICLE

(75) Inventors: Susumu Michisaka, Saitama (JP); Hiroshi Kitamoto, Saitama (JP); Kengo Yano, Saitama (JP); Toshiharu Tomomatsu, Saitama (JP); Fujio Nakamura, Saitama (JP); Yu Miyajima, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 39 days.

(21) Appl. No.: 13/304,465

(22) Filed: Nov. 25, 2011

(65) Prior Publication Data

US 2012/0133170 A1    May 31, 2012

(30) Foreign Application Priority Data

Nov. 30, 2010   (JP) ................................ 2010-266900

(51) Int. Cl.
*B60R 7/00*   (2006.01)
(52) U.S. Cl.
USPC ........................................ 296/37.1; 296/37.8
(58) Field of Classification Search
USPC .......................... 296/37.1, 78.1; 224/412, 413
See application file for complete search history.

(56) References Cited

U.S. PATENT DOCUMENTS

| 4,619,476 A * | 10/1986 | Kawasaki .................... 296/37.1 |
| 4,807,919 A * | 2/1989 | Ito .............................. 296/37.1 |
| 6,581,709 B2 * | 6/2003 | Tsuji ............................. 180/90 |
| 7,431,374 B2 * | 10/2008 | Konno et al. ................. 296/78.1 |
| 8,286,746 B2 * | 10/2012 | Miyajima et al. ............. 180/219 |
| 2008/0030041 A1 * | 2/2008 | Kurihara ...................... 296/78.1 |
| 2011/0227311 A1 * | 9/2011 | Miyajima et al. ............. 280/202 |

FOREIGN PATENT DOCUMENTS

JP    11-152068 A    6/1999

* cited by examiner

*Primary Examiner* — Jason S Morrow
(74) *Attorney, Agent, or Firm* — Birch, Stewart, Kolasch & Birch, LLP

(57) ABSTRACT

An inner rack structure for a saddle-ride type vehicle which can easily form an inner rack with a distinctive outward appearance. An inner rack opening that opens upwardly is provided in an upper cover, and an inner rack body portion formed to bulge in a forward direction is provided in the upper portion of a lower cover. The inner rack opening is covered from below and the front by the inner rack body portion, and the inner rack body portion is covered from a rear direction by a lower-side rear wall portion that extends downwardly from the inner rack opening of the upper cover, thereby forming an inner rack serving as a storage portion.

20 Claims, 7 Drawing Sheets

INNER RACK STRUCTURE FOR SADDLE-RIDE TYPE VEHICLE

CROSS-REFERENCE TO RELATED APPLICATIONS

The present application claims priority under 35 USC 119 to Japanese Patent Application No. 2010-266900 filed on Nov. 30, 2010 the entire contents of which are hereby incorporated by reference.

BACKGROUND OF THE INVENTION

1. Field of the Invention

The present invention relates to an inner rack structure for a saddle-ride type vehicle in which a storage portion is formed in front of the legs of a rider seated on a seat in the saddle-ride type vehicle.

2. Description of Background Art

Some saddle-ride type vehicles have an inner rack as a storage portion provided in front of the legs of a rider seated on a seat. In the scooter type vehicle disclosed in JP-A No. H11-152068, an inner cover forming the rear surface of a leg shield is formed by an upper-side cover, and a lower-side cover that is a separate component from the upper-side cover, and the lower portion of the upper-side cover and the upper portion of the lower-side cover are lapped together in such a way that the upper portion of the lower-side cover is located more rearwardly in a rear view, thereby forming an inner rack.

According to the above-mentioned structure, by forming the inner cover in two components, a distinctive outward appearance is obtained, and the inner rack can be formed without increasing the number of parts.

Vehicles such as scooter-type vehicles provide an observer with an attractive impression based on their distinctive outward appearance. For this reason, a structure that can form a distinctive outward appearance is desired for various parts.

SUMMARY AND OBJECTS OF THE INVENTION

The present invention has been made in view of the above-mentioned circumstances, and accordingly it is an object of an embodiment of the present invention to provide an inner rack structure for a saddle-ride type vehicle that can easily form an inner rack with a distinctive outward appearance.

According to an embodiment of the present invention, an inner rack structure for a saddle-ride type vehicle is provided that includes a leg shield (29) that covers a leg of a rider from the front, a front cover (31) that forms a front surface portion of the leg shield (29), and an inner cover (32) that forms a rear surface portion of the leg shield (29), in which the inner cover (32) is formed by an upper cover (33) arranged at an upper side, and a lower cover (34) provided as a separate component below the upper cover (33). An inner rack (35) serves as a storage portion that opens upwardly and being formed by a mating structure of a lower portion of the upper cover (33) and an upper portion of the lower cover (34), wherein an inner rack opening (40) that opens upwardly is provided in the upper cover (33). An inner rack body portion (47) is formed to bulge forwardly and is provided in an upper portion of the lower cover (34) with the inner rack (35) serving as the storage portion formed by covering the inner rack opening (40) from below and in the front by the inner rack body portion (47), and covering the inner rack body portion (47) from the rear by a wall portion (43) that extends downwardly from the inner rack opening (40) of the upper cover (33).

According to an embodiment of the present invention, a water scraping rib (80, 81) is provided in a front surface of the upper cover (33) and above the inner rack opening (40), the water scraping rib (80, 81) protruding more forward than a mating portion (55) of the inner rack body portion (47) with a circumferential edge of the inner rack opening (40).

According to an embodiment of the present invention, a breadth of the water scraping rib (80, 81) is larger than a breadth of the inner rack opening (40).

According to an embodiment of the present invention, the water scraping rib (80, 81) is curved in an upwardly convex shape.

According to an embodiment of the present invention, the upper cover (33) is provided with a lower cover fastening portion (67, 68) that fastens the lower cover (34), and the water scraping rib (80, 81) extends and couples to the lower cover fastening portion (67, 68).

According to an embodiment of the present invention, the upper cover (33) is provided with a frame fastening portion (38) that is fastened to a body frame (13), and the water scraping rib (80, 81) extends and couples to the frame fastening portion (38).

According to an embodiment of the present invention, a mating portion (44, 46) in a rear surface between the upper cover (33) and the lower cover (34) is formed in an upwardly convex shape.

According to an embodiment of the present invention, the leg shield can be formed with a distinctive outward appearance by two components, and the inner rack can be formed without increasing the number of parts. Also, since the inner rack opening is provided in the upper cover, the inner rack opening can be formed as an integral part, thereby enhancing the sense of rigidity of the opening.

According to an embodiment of the present invention, it is possible to restrain water that has reached the back surface of the upper cover from entering the inner rack from the mating portion between the inner rack body portion and the circumferential edge of the inner rack opening.

According to an embodiment of the present invention, it is possible to effectively restrain water from entering the inner rack.

According to an embodiment of the present invention, it is possible to effectively restrain water from entering the inner rack.

According to an embodiment of the present invention, the rigidity of the water scraping rib can be enhanced.

According to an embodiment of the present invention, since the water scraping rib extends to the fastening portion with the body frame, the rigidity of the upper cover can be enhanced.

According to an embodiment of the present invention, water that has reached the mating portion in the rear surface between the upper cover and the lower cover can be easily guided away to the left and right and, as a result, the amount of water flowing in the middle portion of the lower cover can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
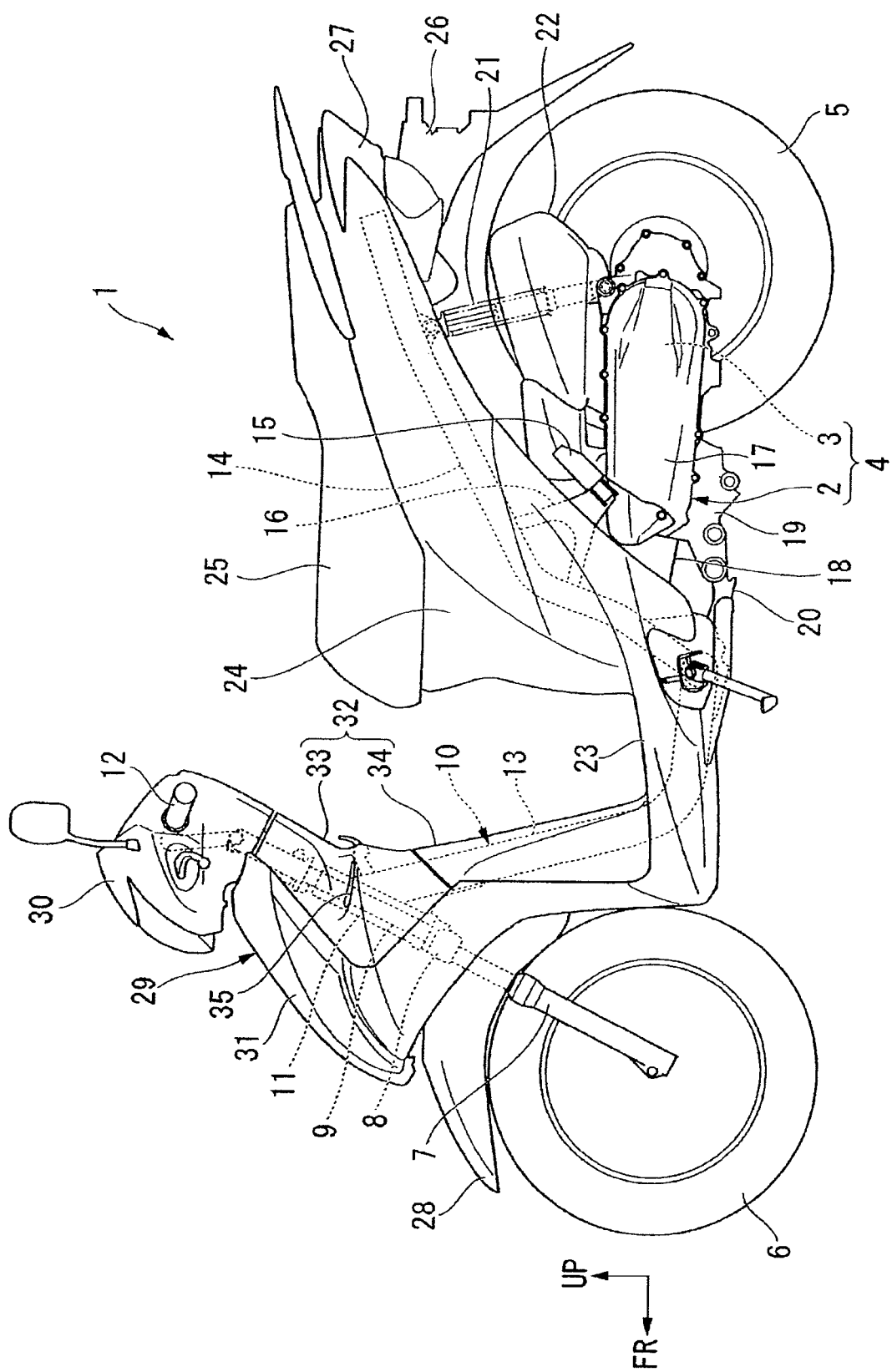
FIG. 1 is a left side view of a motorcycle according to an embodiment of the present invention.

Hereinbelow, an embodiment of the present invention will be described with reference to the drawings. It should be noted that in the drawings used in the following description, arrow FR indicates the front side of the vehicle, arrow UP indicates the upper side of the vehicle, and arrow LH indicates the left side of the vehicle.

FIG. 1 shows a scooter type motorcycle 1 to which a structure according to this embodiment is applied. The motorcycle 1 has a swing unit 4 including an engine 2 and a power transmission mechanism 3. A rear wheel 5 is rotatably supported on the rear portion of the swing unit 4, and a front wheel 6 is arranged in front of the swing unit 4. The front wheel 6 is turnably supported on the lower portion of a front fork 7 provided as a left and right side pair.

A bridge 8 is suspended on the upper portion of the front fork 7 on the left and right sides. A steering shaft 9 is provided so as to stand from the middle of the width direction of the bridge 8. The steering shaft 9 is rotatably supported on a head pipe 11 provided at the front end of a body frame 10. The front fork 7 is steerably supported on the head pipe 11. A steering handlebar 12 is provided in the upper portion of the steering shaft 9.

The body frame 10 includes the head pipe 11, a main frame 13, and a rear frame 14 that is provided as a left and right side pair. The main frame 13 extends downward to the rear from the head pipe 11, and thereafter curves so as to extend rearwardly. The rear frame 14 extends upwardly to the rear from the rear end of the main frame 13. A step frame 16 provided as a left and right side pair is welded to the rear frame 14. The step frame 16 supports a step 15 on which the pillion passenger places a leg.

The engine 2 of the swing unit 4 includes a crankcase 17, and a cylinder 18 coupled to the crankcase 17. The power transmission mechanism 3 includes a belt-type continuously variable transmission mechanism, and is accommodated in the crankcase 17. The rotational power of the engine 2 is transmitted to the rear wheel 5 via the power transmission mechanism 3. The swing unit 4 is supported so as to be capable of swinging up and down, as a link connecting portion 19 provided in the front-side lower portion of the crankcase 17 is supported on a link member 20 provided at the rear end of the main frame 13. A rear shock absorber 21 is interposed between the rear-side upper portion of the swing unit 4 and the rear portion of the rear frame 14. Intake parts such as an air cleaner 22 are disposed atop the swing unit 4.

A plate-like floor step 23 on which the rider places his/her legs is arranged substantially horizontally in a substantially horizontal area in the lower portion of the main frame 13. A body cover 24 that extends from the rear portion of the floor step 23 covers the rear portion of the vehicle body. A seat 25 on which the rider is seated is provided above the body cover 24. A rear fender 26 that extends downwardly to the rear is provided in the rear portion of the body cover 24. A combination lamp 27 including a brake lamp and a blinker is attached to the rear fender 26.

A front fender 28 is provided above the front wheel 6. The front fender 28 is fixed to the bridge 8. A leg shield 29 is provided above and to the rear of the front fender 28. The leg shield 29 is made of a resin material and covers the legs of the rider seated on the seat 25 from front. The leg shield 29 extends upward from the front end of the floor step 23. A handlebar cover 30 that covers the steering handlebar 12 is provided above the leg shield 29. A headlight or the like is mounted in the handlebar cover 30.

The leg shield 29 has a front cover 31 and an inner cover 32. The front cover 31 is located at the front side and forms the front surface portion of the leg shield 29. The inner cover 32 is located on the rear side of the front cover 31 and forms the rear surface portion of the leg shield 29. The inner cover 32 has an upper cover 33 arranged at the upper side, and a lower cover 34 provided as a separate component below the upper cover 33. The upper cover 33 and the lower cover 34 are each molded from a rein material. An inner rack 35 is formed in the inner cover 32. The inner rack 35 serves as a storage portion that opens upwardly.

Figure 2:
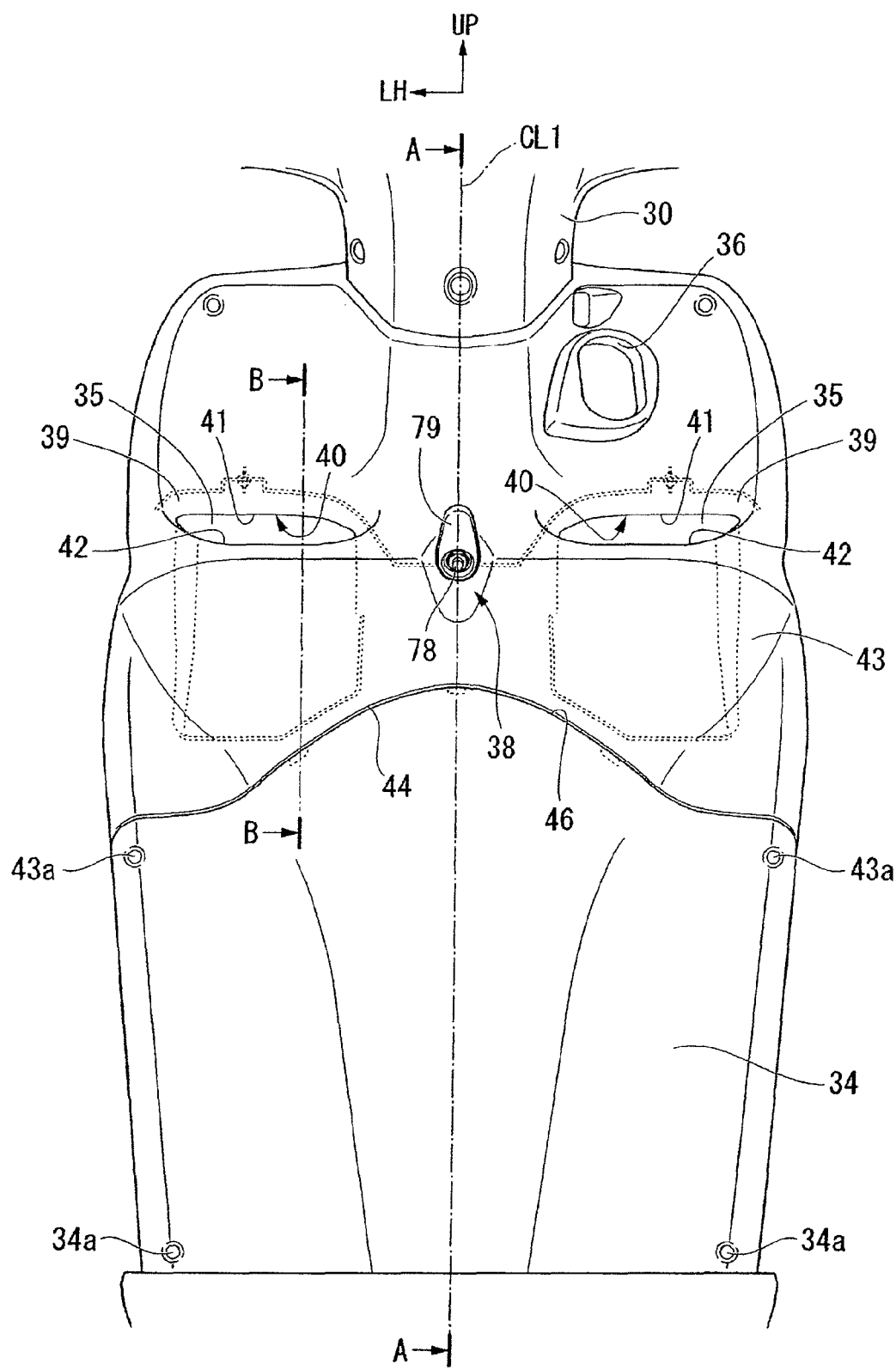
FIG. 2 is a rear view of a leg shield of the motorcycle.

As shown in FIG. 2, the inner rack 35 is formed as a left and right side pair across a centerline CL1 in the vehicle width direction. The opening of the inner rack 35 extends slightly upward to the front (see also FIG. 1) from rear, and the opening opens from the upper side toward the rear. In FIG. 2, the handlebar cover 30 located above the upper cover 33 is shown. The rear-side lower portion of the handlebar cover 30 exhibits a U-shape or arcuate shape that bulges toward the rear. Also, in the upper cover 33, an insertion hole 36 for a key cylinder is formed above the inner rack 35 on the right side.

The inner rack 35 is formed by lapping the lower portion of the upper cover 33 and the upper portion of the lower cover 34 together, front to rear. The upper cover 33 is attached from the rear of the lower cover 34, in a state with the lower cover 34 fixed to the vehicle body side. Referring to FIG. 1, the lower cover 34 is fixed to the vehicle body side by the front cover 31 and the floor step 23. In FIG. 2, a coupling portion 34 is provided with the front cover 31 which is formed in the lower cover 34.

Figure 3:
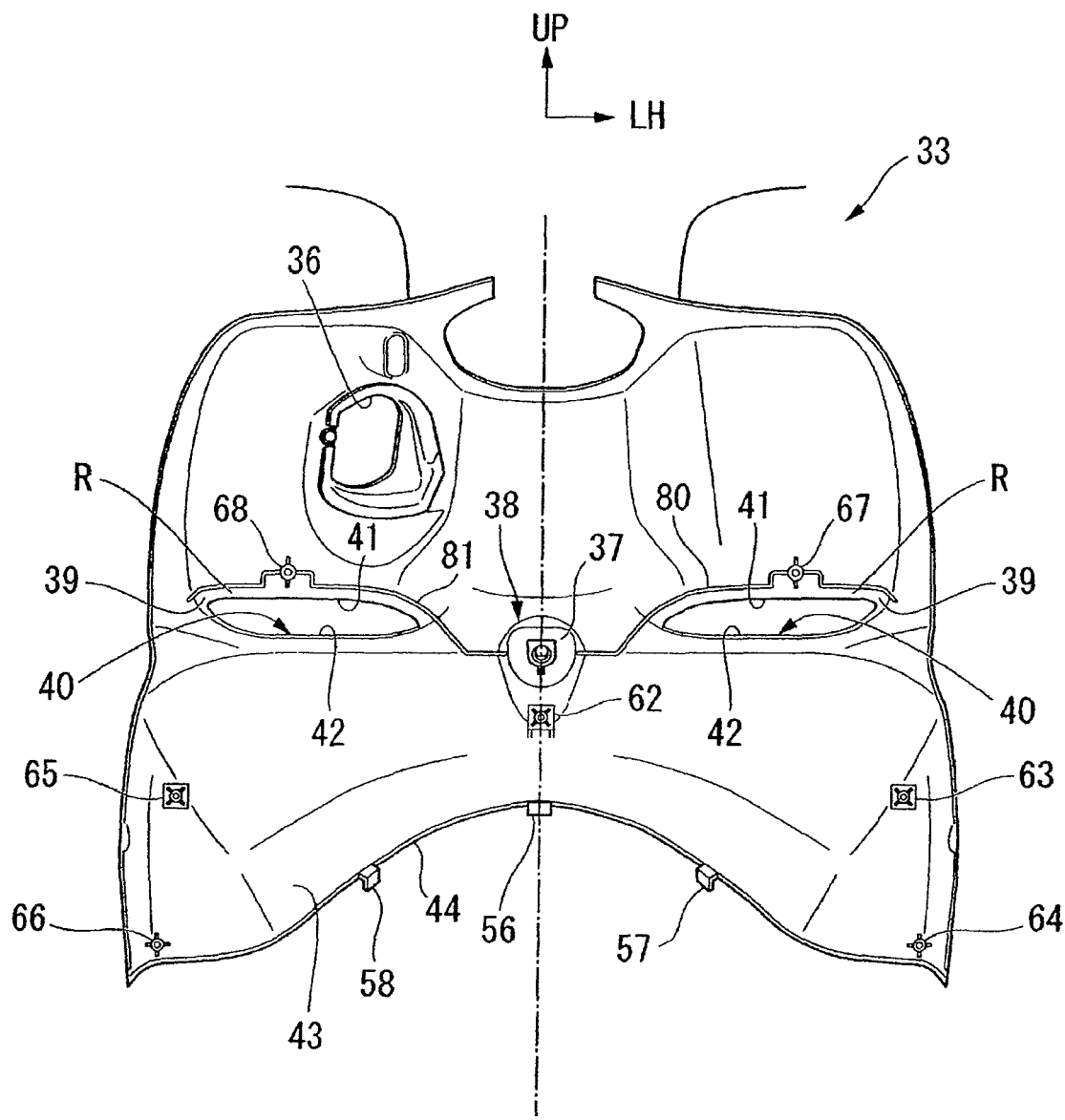
FIG. 3 is a front view of an upper cover constituting an inner cover of a leg shield.

As shown in FIGS. 2 and 3, a frame fastening portion 38 forming a bolt bearing surface 37 is formed so as to be recessed toward the front, in the middle area of the vertical direction and vehicle width direction of the upper cover 33. Although described later in detail, the upper cover 33 is fixed to the main frame 13 by the frame fastening portion 38. In the portion above the frame fastening portion 38, the upper cover 33 extends substantially straight toward the rear wall of the handlebar cover 30. On the other hand, the upper cover 33 extends forward from the left and right of the frame fastening portion 38, forming a flat surface portion 39 provided as a left and right side pair extending along the longitudinal direction in substantially the middle of the vertical direction. An inner rack opening 42 provided as a left and right side pair each forming the opening of the inner rack 35 is formed in the flat surface portion 39 at the left and right sides of the upper cover 33.

The inner rack opening 40 exhibits a substantially rectangular shape that is rounded at the four corners. The inner rack opening 40 is formed so as to open from the upper side toward the rear, in such a way that its front-side edge 41 is located above a rear-side edge 42. The front-side edge 41 of the inner rack opening 40 is formed so as to curve in an upwardly convex shape. The upper cover 33 has a lower-side rear wall portion 43 that extends downwardly from the lower portion of the frame fastening portion 38 and from the rear end of the flat surface portion 39 on the left and right sides. The lower-side rear wall portion 43 is a part that laps on the upper portion of the lower cover 34 in rear view. The lower-side rear wall portion 43 has an upper-side mating portion 44 at its lower end. The upper-side mating portion 44 is formed in an upward convex curved shape in rear view or front view, and abuts on the lower cover 34 in the vertical direction as shown in FIG. 2.

Figure 4:
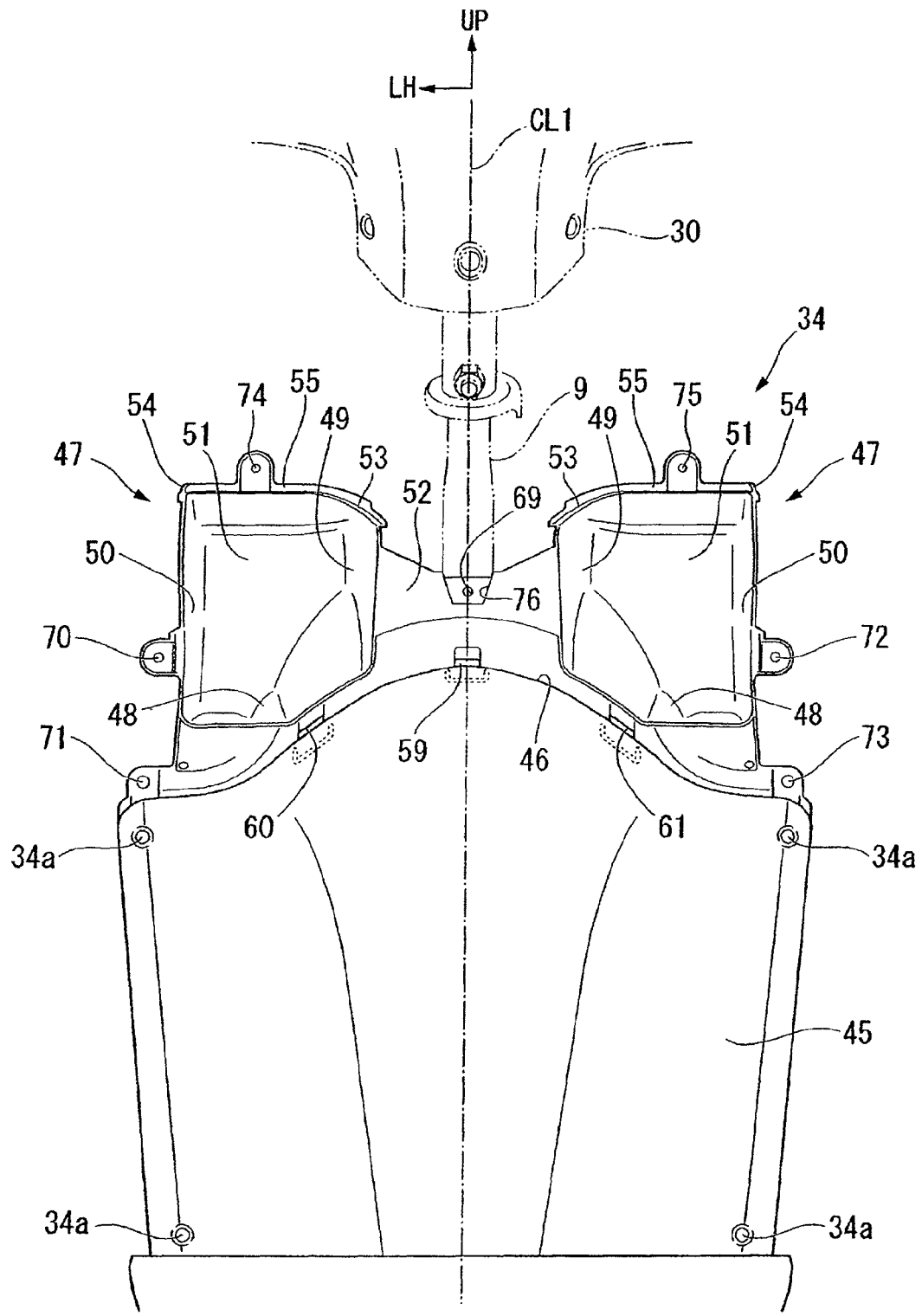
FIG. 4 is a rear view of a lower cover constituting an inner cover of a leg shield.

On the other hand, as shown in FIG. 4, the lower cover 34 has a lower cover body 45 that covers the rear surface of the front cover 31. The lower cover body 45 has a lower-side mating portion 46 at its upper edge. The lower-side mating portion 46 is formed in an upwardly convex curved shape in rear view, and abuts on the upper-side mating portion 44 of the upper cover 33. Also, an inner rack body portion 47 is provided above the lower-side mating portion 46 of the lower cover 34. The inner rack body portion 47 is formed so as to be divided into the left and right sides across the centerline CL in the vehicle width direction, and forms the inner rack 35 in cooperation with the upper cover 33. The inner rack body portion 47 is formed so as to bulge forward from the upwardly extended plane of the lower cover body 45.

The inner rack body portion 47 has a bottom wall 48 that protrudes forward from the upwardly extended plane of the lower cover body 45, an inner-side wall 49 that rises upwardly from the inner end in the vehicle width direction of the bottom wall 48, an outer-side wall 50 that rises upwardly from the outer end in the vehicle width direction of the bottom wall 48, and a front wall 51 that rises upwardly from the front end of the bottom wall 48, thus defining a space enclosed by these walls. The inner-side wall 49 on the left and the inner-side wall 49 on the right are connected by a connecting wall portion 52. The connecting wall portion 52 is formed so as to rise upwardly substantially straight from the middle area of the vehicle width direction of the lower-side mating portion 46.

The upper edges of the inner-side wall 49, outer-side wall 50, and front wall 51 of the inner rack body portion 47 are parts that abut on a circumferential edge R on the back surface side of the inner rack opening 40 shown in FIG. 3. The upper edges of the inner-side wall 49, outer-side wall 50, and front wall 51 will be referred to as inner-side mating portion 53, outer-side mating portion 54, and front-side mating portion 55, respectively.

Figure 5:
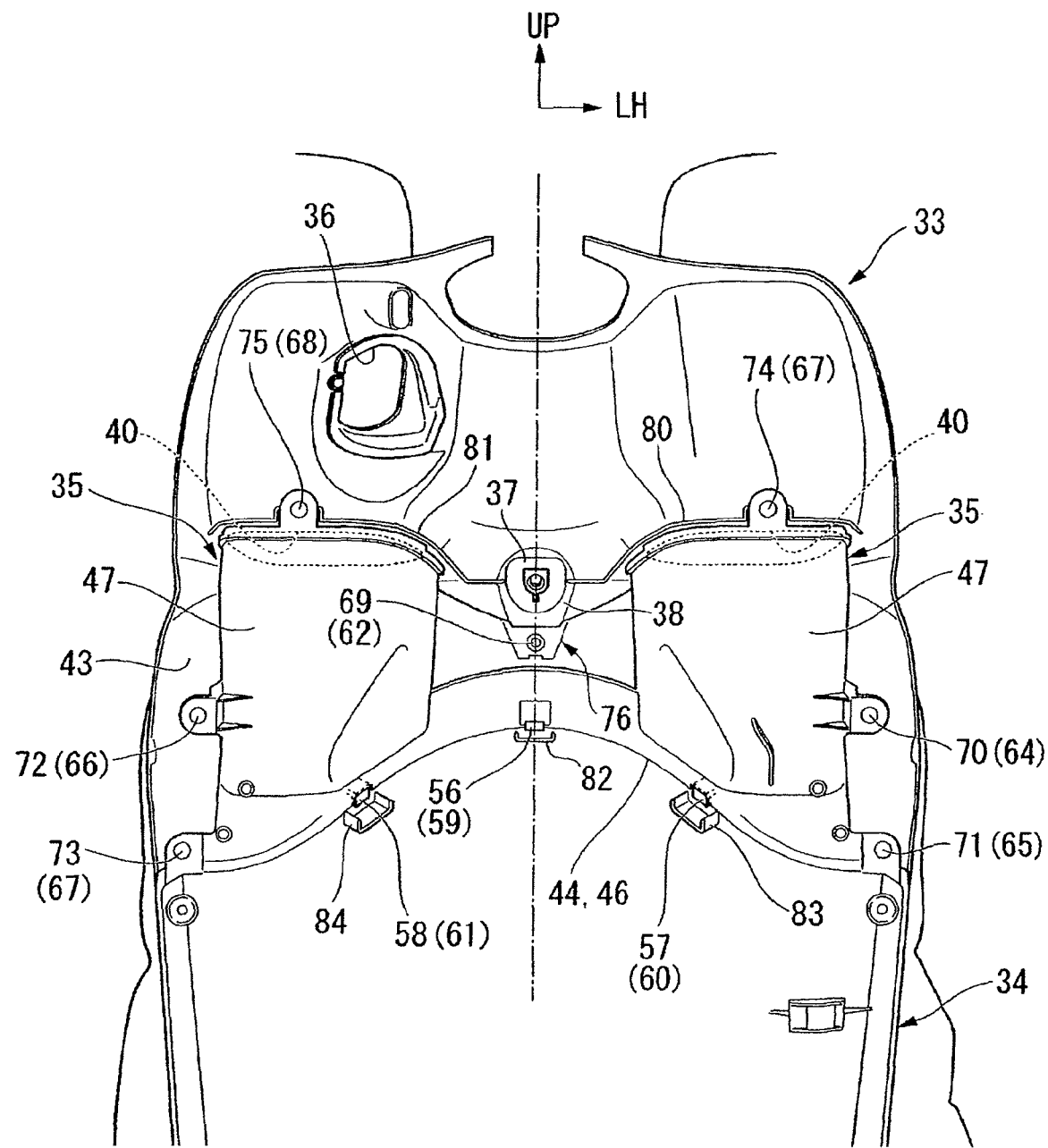
FIG. 5 is a front view of an inner cover constituting a leg shield.

As shown in FIG. 5, the lower cover 34 and the upper cover 33 are lapped together in such a way that the inner rack body portion 47 of the lower cover 34 covers the inner rack opening 40 of the upper cover 33 from below and from the front, and that the lower-side rear wall portion 43 of the upper cover 33 covers the open portion in rear of the inner rack body portion 47 from rear. Thus, the open portion above the inner rack body portion 47 is exposed to the outside from the inner rack opening 40, and an enclosed space is formed by corporation between the inner rack body portion 47 and the lower-side rear wall portion 43, thereby forming the inner rack 35 serving as a storage portion.

Upon lapping the upper cover 33 on the lower cover 34, the inner-side mating portion 53 of the inner-side wall 49 of the inner rack body portion 47, the outer-side mating portion 54 of the outer-side wall 50, and the front-side mating portion 55 of the front wall 51 abut on the circumferential edge R on the back surface side of the inner rack opening 40 without a gap.

The rear edges of the bottom wall 48, inner-side wall 49, and outer-side wall 50 abut on the lower-side rear wall portion 43 of the upper cover 33 without a gap. As shown in FIG. 2, upon lapping the upper cover 33 on the lower cover 34, the upper cover 33 and the lower cover 34 become smoothly continuous above and below one another so that the curved shape of the upper-side mating portion 44 of the upper cover 33 extends along the lower-side mating portion 46 of the lower cover 34.

As shown in FIG. 3, a middle claw 56 is formed in the middle of the vehicle width direction of the upper-side mating portion 44 of the upper cover 33, and a left claw 57 and a right claw 58 are formed on the left and right of the middle claw 56. The middle claw 56, the left claw 57, and the right claw 58 have an L-shape in cross section, and protrude forward. As shown in FIG. 4, at the upper side of the lower-side mating portion 46 of the lower cover 34, a middle engaging hole 59 is formed in the middle of the vehicle width direction, and a left engaging hole 60 and a right engaging hole 61 are formed on the left and right of the middle engaging hole 59. Upon lapping the upper cover 33 on the lower cover 34, as shown in FIGS. 5, 6, and 7, the middle claw 56 is engaged with the middle engaging hole 59, the left claw 57 is engaged with the left engaging hole 60, and the right claw 58 is engaged with the right engaging hole 61.

As shown in FIG. 3, a forwardly protruding, tubular middle fastening bolt portion 62 is formed on the side below the frame fastening portion 38 in the front surface of the upper cover 33. Further, at the left end side of the lower-side rear wall portion 43, forwardly protruding, tubular fastening boss portions 63 and 64 are formed so as to be arranged above and below one another, and at the right end side of the lower-side rear wall portion 43, forwardly protruding, tubular fastening boss portions 65 and 66 are formed so as to be arranged above and below one another. Further, forwardly protruding, tubular fastening boss portions 67 and 68 are formed above the inner rack opening 40 on the left and right sides.

On the other hand, as shown in FIG. 4, in the lower cover 34, a middle bolt insertion hole 69, and bolt insertion holes 70 to 75 are formed at positions corresponding to the middle fastening boss portion 62, and the fastening boss portions 63 to 68, respectively. The upper portion of the connecting wall portion 52 is formed in a recessed shape in rear view that extends downwardly toward the inner side in the vehicle width direction from both sides. A water receiving portion 76 is formed in the middle of the upper portion located at the bottom side of the recessed shape. The water receiving portion 76 has a U-shaped cross section and protrudes forward. The middle bolt insertion hole 69 is formed in the wall portion of the water receiving portion 76. Upon lapping the upper cover 33 on the lower cover 34, as shown in FIG. 5, the middle bolt insertion hole 69 and the bolt insertion holes 70 to 75 are respectively abutted on the middle fastening boss portion 62 and the fastening boss portions 63 to 68, and brought into threaded engagement to be fixed in place.

Figure 6:
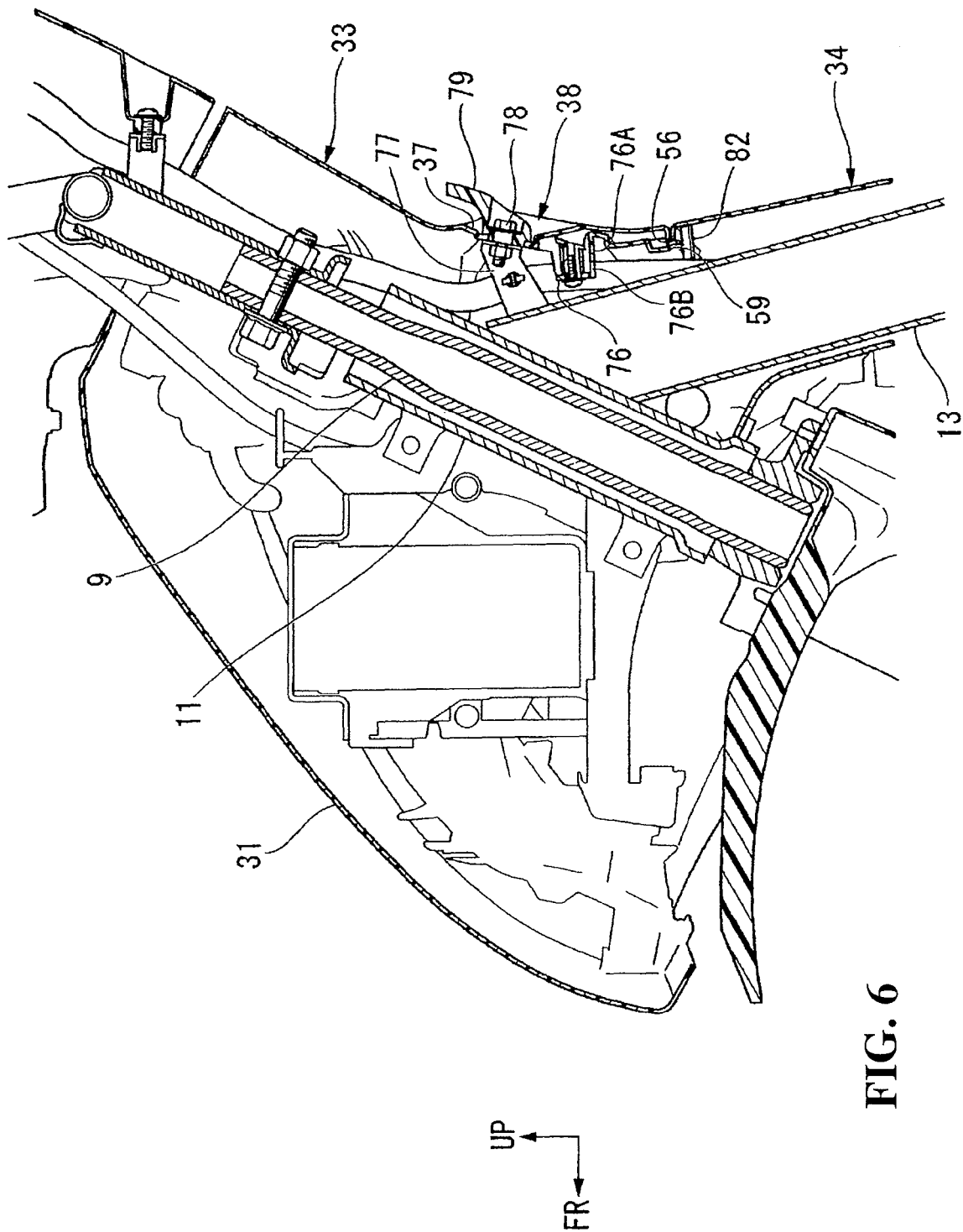
FIG. 6 is a sectional view taken along line A-A of FIG. 2.
Figure 7:
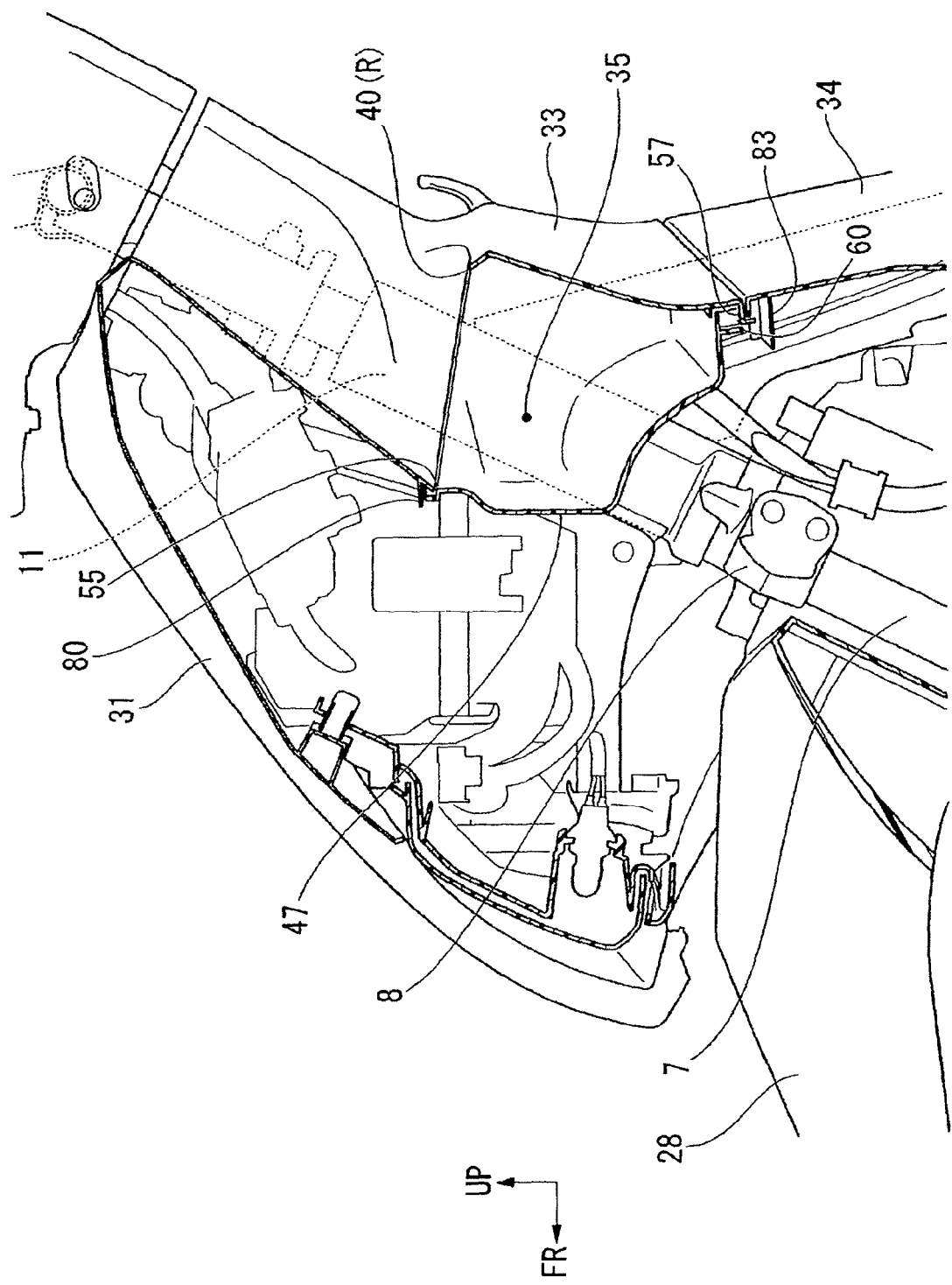
FIG. 7 is a sectional view taken along line B-B of FIG. 2.

As shown in FIG. 6, a stay 77 is welded to the main frame 13. The stay 77 protrudes rearwardly, and abuts on the bolt bearing surface 37 formed in the frame fastening portion 38 of the upper cover 33. In the stay 77, there is formed a bolt insertion hole (not shown) that is coaxial with a bolt insertion hole (not shown) formed in the bolt bearing surface 37. The upper cover 33 is fixed to the vehicle body by being fastened to the stay 77 with a bolt 78. As shown in FIG. 2, the bolt 78 also fastens a hook 79 together, thereby fixing the hook 79 to the upper cover 33. Luggage can be hooked on the hook 79.

As shown in FIG. 3, forwardly protruding water scraping ribs 80 and 81 are formed integrally above the inner rack opening 40 on the left and right sides in the front surface of the upper cover 33. The water scraping ribs 80 and 81 are formed larger in breadth than the inner rack opening 40 in the vehicle width direction. The water scraping ribs 80 and 81 bend in an upwardly convex shape near the fastening boss portions 67 and 68, and couple to the fastening boss portions 67 and 68 so as to straddle the fastening boss portions 67 and 68.

The water scraping ribs 80 and 81 exhibit an upward convex, curved shape in front view. The water scraping ribs 80 and 81 each extend along the front-side edge 41 of the inner rack opening 40, curve downward toward the inner side in the vehicle width direction, and thereafter bend so as to become substantially horizontal so that its inner-side end in the vehicle width direction is coupled to the lateral side of the frame fastening portion 38. Referring to FIG. 7, the water scraping ribs 80 and 81 protrude more in a forward direction than the front-side mating portion 55 that abuts on the circumferential edge R of the inner rack opening 40 in the inner rack body portion 47. It should be noted that although not shown, the water scraping ribs 80, 81 are formed so as to protrude more than the inner-side mating portion 53 of the inner rack body portion 47.

The water scraping ribs 80 and 81 prevent water droplets that have entered the leg shield 29 from entering the inner rack 35, and let water escape by guiding water away to the inner and outer sides in the vehicle width direction due to its curved shape. In this regard, as shown in FIG. 5, the lower portion of the frame fastening portion 38 to which the inner-side end in the vehicle width direction of each of the water scraping ribs 80 and 81 couples is fitted in the water receiving portion 76 with a gap. As shown in FIG. 6, a water draining hole 76B that lets water escape to the outside is formed in a bottom wall 76A of the water receiving portion 76. The bottom wall 76A slopes down toward the front, and guides water downward.

Referring to FIG. 5, in the lower cover 34, a middle mudguard rib 82 is formed below the middle engaging hole 59, a left mudguard rib 83 is formed below the left engaging hole 60, and a right mudguard rib 84 is formed below the right engaging hole 61. The middle mudguard rib 82, the left mudguard rib 83, and the right mudguard rib 84 are each formed in a U-shape in cross section that opens upwardly. As shown in FIGS. 6 and 7, when the upper cover 33 is attached to the lower cover 34, the middle mudguard rib 82, the left mudguard rib 83, and the right mudguard rib 84 cover the middle engaging hole 59, the left engaging hole 60, and the left engaging hole 61 from below, respectively.

The middle mudguard rib 82, the left mudguard rib 83, and the right mudguard rib 84 prevent mud or the like thrown up by the front wheel 6 from passing the middle engaging hole 59, the left engaging hole 60, and the right engaging hole 61, respectively, and also each serves as a screen for the inside of the leg shield 29.

As described above, in this embodiment, the inner rack opening 40 that opens upwardly is integrally provided in the upper cover 33, the inner rack body portion 47 formed so as to bulge forward is provided in the upper portion of the lower cover 34, and the inner rack 35 from the front by the inner rack body portion 47, and covering the inner rack body portion 47 from the rear by the lower-side rear wall portion 43 that extends downwardly from the inner rack opening 40 of the upper cover 33.

Therefore, the leg shield 29 can be formed with a distinctive outward appearance by two components, and the inner rack 35 can be formed without increasing the number of parts. Also, since the inner rack opening 40 is provided in the upper cover 33, the inner rack opening 40 can be formed as an integral part, thereby enhancing the sense of rigidity of the opening 40.

Also, the water scraping ribs 80 and 81 are provided in the front surface of the upper cover 33 and above the inner rack opening 40, and protrude more in a forward direction than the mating portion of the inner rack body portion 47 with the circumferential edge R of the inner rack opening 40. Thus, it is possible to restrain water that has reached the back surface of the upper cover 33 from entering the inner rack 35 from the mating portion between the inner rack body portion 47 and the circumferential edge R of the inner rack opening 40.

Further, the water scraping ribs 80 and 81 have a breadth larger than that of the inner rack opening 40, and are curved upwardly, thereby effectively restraining water from entering the inner rack 35. Also, since the water scraping ribs 80 and 81 extend and are coupled to the fastening boss portions 67 and 68 each serving as a lower cover fastening portion, the rigidity of the water scraping ribs can be secured. Further, since each of the water scraping ribs 80 and 81 extend and are coupled to the frame fastening portion 38, the rigidity of the upper cover 33 can be enhanced.

In addition, above the inner rack opening 40, the water scraping ribs 80 and 81 are curved upwardly along the curved shape of the inner rack opening 40. Thus, the water scraping ribs 80 and 81 can be placed in close proximity to the inner rack opening 40 to thereby enhance the rigidity of the opening, and also allow water to easily flow to the left and right, thereby restraining water from entering the inner rack 35.

Also, the upper-side mating portion 44 and the lower-side mating portion 46 each serving as a mating portion in the rear surface between the upper cover 33 and the lower cover 34 is formed in an upwardly convex shape. Thus, water that has reached the upper-side mating portion 44 and the lower-side mating portion 46 can be easily guided away to the left and right and, as a result, the amount of water flowing in the middle portion of the lower cover 34 can be reduced.

It should be noted that while this embodiment mentioned above is directed to the case of applying the present invention to a motorcycle, the present invention can be also suitably applied to a three-wheeled vehicle. Also, the present invention can be also suitably applied to an electric motorcycle or a fuel cell-powered vehicle. Also, while the above-mentioned embodiment is directed to the configuration in which the inner rack 35 is provided as a left and right side pair, the number of inner racks may be one, or three or more.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inner rack structure for a saddle-ride type vehicle, comprising:
    a leg shield for covering a leg of a rider from a forward direction;
    a front cover forming a front surface portion of the leg shield;
    an inner cover forming a rear surface portion of the leg shield, the inner cover being formed by an upper cover arranged at an upper side, and a lower cover provided as a separate component below the upper cover; and
    an inner rack serving as a storage portion that opens upwardly, the inner rack being formed by a mating structure of a lower portion of the upper cover and an upper portion of the lower cover;
    wherein an inner rack opening that opens upwardly is provided in the upper cover;

an inner rack body portion bulging in the forward direction in an upper portion of the lower cover; and the inner rack serving as the storage portion is formed by covering the inner rack opening from below and from the forward direction by the inner rack body portion, and covering the inner rack body portion from a rear direction by a wall portion that extends downwardly from the inner rack opening of the upper cover.

2. The inner rack structure for a saddle-ride type vehicle according to claim 1, wherein a water scraping rib is provided in a front surface of the upper cover and above the inner rack opening, and protrudes more in a forward direction relative to a mating portion of the inner rack body portion with a circumferential edge of the inner rack opening.

3. The inner rack structure for a saddle-ride type vehicle according to claim 2, wherein the water scraping rib is formed larger in width relative to the inner rack opening.

4. The inner rack structure for a saddle-ride type vehicle according to claim 2, wherein the water scraping rib is curved in an upwardly convex shape.

5. The inner rack structure for a saddle-ride type vehicle according to claim 3, wherein the water scraping rib is curved in an upwardly convex shape.

6. The inner rack structure for a saddle-ride type vehicle according to claim 2, wherein the upper cover is provided with a lower cover fastening portion that fastens the lower cover; and the water scraping rib extends and couples to the lower cover fastening portion.

7. The inner rack structure for a saddle-ride type vehicle according to claim 3, wherein the upper cover is provided with a lower cover fastening portion that fastens the lower cover; and the water scraping rib extends and couples to the lower cover fastening portion.

8. The inner rack structure for a saddle-ride type vehicle according to claim 4, wherein the upper cover is provided with a lower cover fastening portion that fastens the lower cover; and the water scraping rib extends and couples to the lower cover fastening portion.

9. The inner rack structure for a saddle-ride type vehicle according to claim 2, wherein the upper cover is provided with a frame fastening portion that is fastened to a body frame; and the water scraping rib extends and couples to the frame fastening portion.

10. The inner rack structure for a saddle-ride type vehicle according to claim 3, wherein the upper cover is provided with a frame fastening portion that is fastened to a body frame; and the water scraping rib extends and couples to the frame fastening portion.

11. The inner rack structure for a saddle-ride type vehicle according to claim 4, wherein the upper cover is provided with a frame fastening portion that is fastened to a body frame; and the water scraping rib extends and couples to the frame fastening portion.

12. The inner rack structure for a saddle-ride type vehicle according to claim 6, wherein the upper cover is provided with a frame fastening portion that is fastened to a body frame; and the water scraping rib extends and couples to the frame fastening portion.

13. The inner rack structure for a saddle-ride type vehicle according to claim 1, wherein a mating portion in a rear surface between the upper cover and the lower cover is formed in an upwardly convex shape.

14. The inner rack structure for a saddle-ride type vehicle according to claim 2, wherein a mating portion in a rear surface between the upper cover and the lower cover is formed in an upwardly convex shape.

15. The inner rack structure for a saddle-ride type vehicle according to claim 3, wherein a mating portion in a rear surface between the upper cover and the lower cover is formed in an upwardly convex shape.

16. The inner rack structure for a saddle-ride type vehicle according to claim 4, wherein a mating portion in a rear surface between the upper cover and the lower cover is formed in an upwardly convex shape.

17. An inner rack structure for a saddle-ride type vehicle, comprising:

a leg shield having a front cover forming a front surface portion of the leg shield;

an inner cover forming a rear surface portion of the leg shield, the inner cover being formed by an upper cover arranged at an upper side, and a lower cover provided as a separate component below the upper cover; and an inner rack opening upwardly, said inner rack being formed by a mating structure of a lower portion of the upper cover and an upper portion of the lower cover including:

an inner rack body portion bulging in the forward direction in an upper portion of the lower cover; and the inner rack is formed by covering the inner rack opening from below and from the forward direction by the inner rack body portion, and covering the inner rack body portion from a rear surface by a wall portion that extends downwardly from the inner rack opening of the upper cover.

18. The inner rack structure for a saddle-ride type vehicle according to claim 17, wherein a water scraping rib is provided in a front surface of the upper cover and above the inner rack opening, and protrudes more in a forward direction relative to a mating portion of the inner rack body portion with a circumferential edge of the inner rack opening.

19. The inner rack structure for a saddle-ride type vehicle according to claim 18, wherein the water scraping rib is formed larger in width relative to the inner rack opening.

20. The inner rack structure for a saddle-ride type vehicle according to claim 18, wherein the upper cover is provided with a lower cover fastening portion that fastens the lower cover; and the water scraping rib extends and couples to the lower cover fastening portion.

* * * * *